United States Patent [19]
Kennedy

[11] 3,859,542
[45] Jan. 7, 1975

[54] HARMONIC AND POWER FACTOR COMPENSATION MEANS AND METHOD FOR POWER SYSTEMS CONTROLLED BY A NON-LINEAR DEVICE

[75] Inventor: Theodore R. Kennedy, Willingboro, N.J.

[73] Assignee: Inductotherm Corporation, Rancocas, N.J.

[22] Filed: Sept. 12, 1973

[21] Appl. No.: 396,625

[52] U.S. Cl. .................. 307/88 R, 333/76, 321/9, 307/105
[51] Int. Cl. ............................................. H03h 7/02
[58] Field of Search............ 307/88 R, 105; 333/76; 321/9

[56] References Cited
UNITED STATES PATENTS

| | | | |
|---|---|---|---|
| 3,501,686 | 3/1970 | Tveteras et al. | 333/76 |
| 3,535,542 | 10/1970 | Gilsig | 307/105 |
| 3,555,291 | 1/1971 | Dewey | 333/76 |
| 3,571,767 | 3/1971 | Bush | 333/76 |

*Primary Examiner*—Stanley M. Urynowicz, Jr.
*Attorney, Agent, or Firm*—Seidel, Gonda & Goldhammer

[57] ABSTRACT

The fundamental frequency power factor is improved and a practical reduction in significant harmonic current is made in electrical power systems where the power to the load is controlled by a non-linear device, such as a saturable reactor, by using series inductive-capacitive filters to filter the significant harmonic current to act as a shunt for harmonic current in conjunction with a supply line inductive reactance. The resonant frequency of each filter is less than the frequency of the harmonic current and the impedance of each said inductive-capacitive filter is a net inductive reactance. The capacitive element of the filter provides a leading power factor component to compensate for the lagging power factor component imposed on the supply system by the non-linear control device.

7 Claims, 6 Drawing Figures

Patented Jan. 7, 1975

HARMONIC AND POWER FACTOR COMPENSATION MEANS AND METHOD FOR POWER SYSTEMS CONTROLLED BY A NON-LINEAR DEVICE

This invention relates to harmonic and power factor compensation for power systems controlled by a non-linear device. More particularly, this invention relates to an apparatus and method for improving the fundamental frequency power factor and making a practical reduction in significant harmonic currents when using a non-linear device to control power delivered to the load of a relatively large power system.

The need to correct power factor and to avoid producing harmonic currents in the power supply system are both well known problems which must be overcome in the design of electrical power systems, particularly those which use large amounts of power. Classically, lagging power factors generated by inductive loads are corrected by connecting a capacitor in parallel with the load. The common approach for eliminating harmonic currents is to provide a number of inductive-capacitive filters shunted across the load and tuned to the harmonic frequency or frequencies which are to be filtered and thus prevent the harmonic currents from being reflected back into the power supply system.

When non-linear devices are used to control the electrical power delivered to the load, the resultant power factor is poor and the harmonics generated are severe at all power levels except full power. Such non-linear devices may take the form, for example, of saturable reactors or silicon controlled rectifiers. At full power, these devices are essentially out of the circuit and hence do not effect power factor or generate unwanted harmonics. Saturable reactors introduce a large amount of lagging power factor into the system. According to conventional knowledge, the way to correct the power factor is to add capacitance across the load. Unfortunately, this approach accentuates the harmonics and, at some power levels, increases the KVA in the power supply. At certain other settings, it can make the entire system unstable by creating a resonant condition that may produce and amplify certain additional harmonic effects which can reach damaging levels.

The conventional way to eliminate the harmonics is to add filters tuned to the desired harmonic frequency. This approach, however, fails to take into account the significant amount of harmonics that exist in the power line itself. As a result, further instabilities occur.

For the foregoing reasons, saturable reactors have not been commonly used on large power systems, particularly those which include capacitors in the load such as induction furnaces. The present invention overcomes these problems. This invention provides a filter network that both corrects the power factor and absorbs unwanted harmonic currents without responding detrimentally to the harmonics that exist in the power supply.

The control of current and hence power delivered to a load takes many forms. Among these is the control of an essentially linear load by a non-linear device such as saturable reactor or silicon controlled rectifier. As stated, such methods of controlling power delivered to the load result in the generation of transients, harmonic loading of the source system and adverse power factor correction. Despite these problems, the use of non-linear devices is often desirable because of their convenience, range or quality of control. A purpose of the present invention is to extend the uses to which such devices can be put.

Although saturable reactors and silicon controlled rectifiers are specifically mentioned herein, it should be understood that the present invention is not intended to be limited specifically to such devices. Non-linear devices for controlling the power delivered to the load may take any number of forms, but generally they can be classified as devices where current is interrupted or varied over a range to a fixed impedance load from a constant source of current or voltage to obtain a desired level of operation. The loads themselves may take various forms such as lighting or heaters including induction heaters and induction furnaces. The load may also include static frequency multipliers such as are used with induction furnaces that operate at three or nine times fundamental frequency; i.e., 180 Hz or 540 Hz when connected to a 60 Hz power source.

Excluding the transition period in passing between various control levels, the saturable reactor and the silicon control rectifier have a finite range of effect on the alternating current source. A silicon controlled rectifier using changes in phase angle to control a load has a marked tendency to create undesirable surge-like distortions depending upon the nature of the load; that is, whether it is inductive, capacitive or resistive. Steep current changes also extend the significant range of the higher harmonics. The saturable reactor, on the other hand, creates a lower effective number of harmonics over its operating range than the silicon controlled rectifier, but the relative strength of the harmonics is somewhat higher relative to the fundamental frequency. For example, a saturable reactor in a single phase circuit may have a third to fundamental harmonic content of perhaps 80 percent whereas a silicon controlled rectifier operating at a 90° firing angle may have a third to fundamental harmonic content of 55 percent. The harmonics created by a saturable reactor can be regarded as insignificant above the eleventh harmonic whereas the silicon controlled reactor has readily identifiable harmonics well above twice this value. The foregoing values are derived for a resistive load. However, the principle applies equally to inductive and capacitive loads except the ratios may vary.

For a saturable reactor controlling a resistive load, the current and voltage relationships may be readily derived by conventional engineering techniques. Depending upon the control range built into the saturable reactor, the power output may vary from near zero with an extremely low power factor to practically 100 percent of rated output with substantially unity power factor. Between these extremes, there exists for a normal saturable reactor, a limited spectrum of harmonic currents which when considered as a root-mean-square (R.M.S.) current value produces a volt-ampere (VA) product that together with the real watts gives a power factor indication different from the true fundamental value. This is due to the harmonic currents. Harmonics in the supply current to a load controlled by a non-linear device are readily confirmed by (1) an unjustified ratio of input KVA to KW, (2) inability to correct power factor to unity, (3) different reading between R.M.S. and rectifier type volt meters and ammeters, (4) unusual heating effects on fuses or switches considered to have been consideratively rated, (5) oscilloscope observations, (6) or interference with communications.

Harmonic currents no matter how produced are not desired in utility power supply systems. It is an object of the present invention to reduce the amount of harmonic currents delivered back into a source supply system and also to provide a useful modification of the fundamental frequency power factor.

It has been observed that utility systems have a significant amount of harmonic current. This current is necessarily also filtered by harmonic current filters. Therefore, practical and economic reasons dictate that the filters should not be designed to provide a harmonic-free condition. Indeed, it cannot reasonably be expected to achieve such a condition in view of the harmonic currents provided by the power supply itself. It has therefore been determined that the better approach is to seek improvement by reducing the amount of harmonic current reflected back into the load but not to seek its elimination.

In accordance with the present invention, a significant improvement in the fundamental frequency power factor together with a substantial and practical reduction in the significant harmonic currents is achieved for an alternating current load controlled by a non-linear device. This is accomplished by providing several parallel filters which consist of a linear low loss reactor in series with a capacitor. The values of inductance and capacitance for the filters are chosen such that the resonant frequency of each individual harmonic filter is less than the harmonic frequency of the current it is to bypass. Each individual harmonic filter is designed such that it has a net impedance that is an inductive reactance rather than a capacitive reactance. Still further, each capacitor in each harmonic filter is designed to have a value which provides a leading power factor component to compensate, at least partially, for the lagging power factor imposed on the supply system by the non-linear control device at the supply fundamental frequency.

For the purposes of illustrating the invention, there are shown in the drawings forms which are presently preferred; it being understood, however, that this invention is not limited to the precise arrangements and instrumentalities shown.

Figure 1:
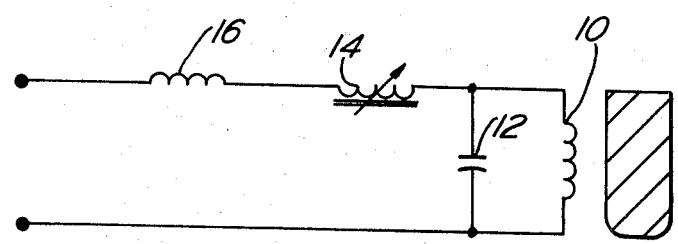
FIG. 1 is a schematic representation of a single phase source supplying electrical power to a large induction melting furnace controlled by a saturable reactor.

Referring now to the drawings in detail, wherein like numerals indicate like elements, there is shown in FIG. 1 a schematic circuit diagram of a single phase circuit for energizing and controlling a large induction melting furnace designated as 10. The furnace 10 forms the load and is generally corrected to unity power factor at the fundamental frequency by the capacitor 12. Power to the induction furnace 10 is controlled from near zero to 100 percent power by a saturable reactor 14. The supply line reactance which could include any special linear reactor or the impedance of a matching supply transformer is schematically illustrated by the coil 16. It is assumed for the purposes of explanation, but not limitation, that the supply system is operating at a frequency of 60 Hz which will be the fundamental frequency. Those skilled in the art will have no difficulty in applying the principles taught herein to other source frequencies such as 50 Hz which is commonly used in many countries other than the United States.

Figure 2:
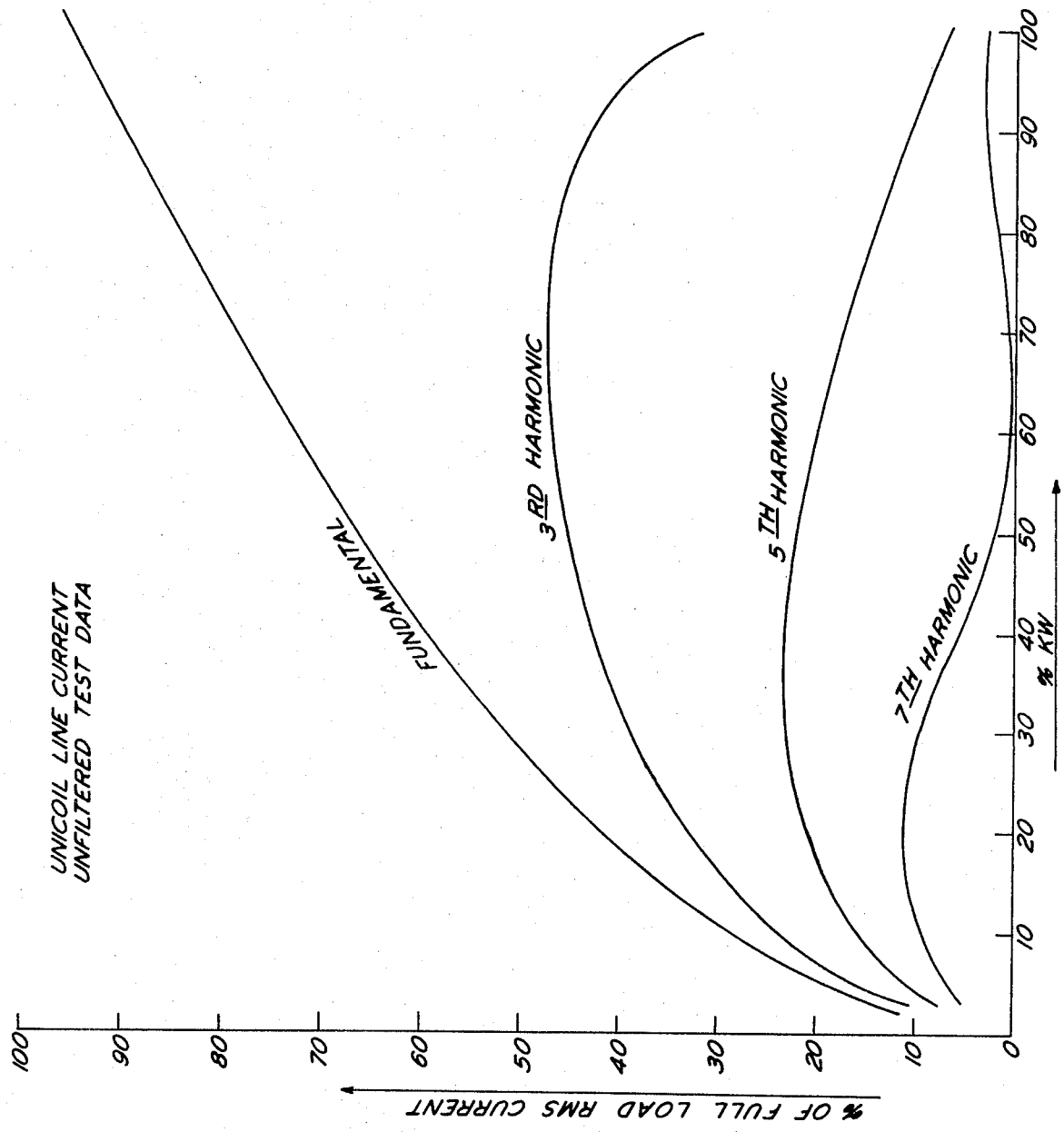
FIG. 2 is a graph plotting the fundamental, third, fifth and seventh harmonic currents for a 60 Hz source supplying the system illustrated in FIG. 1.

FIG. 2 is a graph showing values of the fundamental current and the third, fifth and seventh harmonic currents in a 60 Hz power line supplying the furnace 10 in FIG. 1. The values of current for the fundamental and each of the harmonics are plotted as a percent of the magnetizing current in RMS values from almost no load to 100 percent or full load. Inspection shows that a value of 46 percent of a full load current would be a weighted maximum value for the third harmonic and a value of 22 percent for the fifth harmonic.

The amount of power factor correction is an empirical decision depending upon the practicalities and economies of the system. If power factor correction is chosen to balance to the peak KVAR required, then it should be taken at 50 percent of the full load in kilowatts which is the same as a 70 percent power factor for the situation where the reactive volt amperes and watts are equal. In this situation, the power factor would be leading at 89 percent at full load. At levels approaching zero power, the line KVA would approach 50 percent KVAR for 0 percent power factor leading. Thus, unless the power factor correction means (usually capacitors) is sectionalized and switched in and out of the circuit as required, an excess of leading KVR is imposed on the power source at both low and high power to the load. A compromise is therefore necessary. Inspection of the graph of FIG. 2 shows that a power factor correction in KVAR of 33 ⅓ percent is a reasonable compromise. This value does not completely correct the power factor at the lowest lagging point but corrects enough for a limited range to be practical. At full load, the power factor is leading at 95 percent. Of course, even with this compromise, it is still possible to sectionalize the means used to correct the power factor and switch it as needed to maintain the lowest line KVA. But in many cases, the appropriate selection of an appropriate amount of power factor correction makes this unnecessary.

As previously indicated, the existence of harmonics in the line makes it not only impractical, but also impossible to filter out all of the harmonic current. An attempt to do so may result in overloading the filters. Accordingly, it has been determined that the better approach is to remove only a percentage of the harmonic currents generated as a result of the load and control device. Thus, a certain amount of harmonic current is reflected back into the supply line. The amount of harmonic current so reflected can be adjusted depending upon the requirements of the utility system supplying power.

The accepted method for eliminating harmonic currents is to provide inductance-capacitance devices across the line to short out the harmonics. (See U.S. Pat. No. 3,555,291.) In accordance with the present invention, not all of the harmonic currents are shorted out. Indeed, this result is purposely avoided. Thus, the filter network together with the load control device and the load itself have terminal impedances for the various harmonic frequencies. However, it has been found that the proper selection of these impedances can be used to improve line power factor for certain types of power control devices such as saturable reactors while at the same time making significant reductions in harmonic line current.

Figure 3:
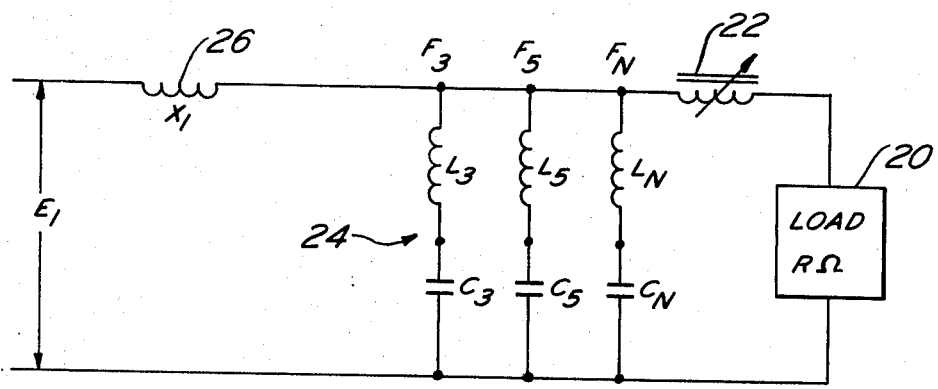
FIG. 3 is a schematic representation of a circuit incorporating the filters of the present invention.

FIG. 3 illustrates the circuit of FIG. 1 modified to incorporate a filter network in accordance with the principles of the present invention. The load 20 is shown schematically since it is not intended that the present invention be limited to use with induction heating and melting furnaces. Load 20 is connected in series with saturable reactor 22 for controlling the power to the load. The filter network 24 which consists of a plurality of series connected inductances and capacitances is shunted across the terminals of the load 20 and saturable reactor 22. Connected between the source $E_1$ and the saturable reactor 22 is a coil 26 which schematically represents the supply line reactance including the reactance of any supply transformer or special linear reactor such as is sometimes used in combination with static frequency multipliers.

The load 20 has been designated R to indicate that it is corrected to substantially unity power factor at the fundamental frequency and hence is essentially resistive at that frequency. In practice, the load may not be at unity power factor, but for purposes of illustrating the invention, it will be so taken. It is believed that any deviation from unity power will be insufficient to substantially modify the principles of the present invention.

Still further, it has been assumed that beyond the reactance 26 there is no impedance to the harmonic currents that are reflected back into the power supply.

Three filters are shown in the filter network 24 in the embodiment of FIG. 3. They are filters $F_3$, $F_5$ and $F_N$. Filter $F_3$ comprises inductor $L_3$ and capacitor $C_3$. Filter $F_5$ comprises inductor $L_5$ and capacitor $C_5$. Filter $F_N$ comprises inductor $L_N$ and capacitor $C_N$. Filter $F_3$ represents the filter for the third harmonic current; filter $F_5$ represents the filter for the fifth harmonic current; and filter $F_N$ represents the filter for all harmonic currents above the fifth harmonic. For the purpose of illustrating the present invention, it is necessary to consider only the third and fifth harmonic filters $F_3$ and $F_5$, respectively.

Each of the filters $F_3$ and $F_5$ necessarily has an impedance and the value of such impedance is a function of frequency. The value of these impedances can be determined in relation to the value of the load resistance at the fundamental frequency $f_1$. Past experience indicates that the value of reactance 26 ($X_1$) can be taken to be approximately 5 percent of the load R in ohms. It should be pointed out, however, that there are many power transformers which have internal impedances in the order of 7 percent of the load. It is, however, a straightforward matter to adjust the value of the impedances of the filters based upon the principles described herein for a 7 percent impedance.

To correctly determine the size of capacitors $C_3$ and $C_5$, reference is first made to FIG. 2 wherein it may be noted that the third harmonic current is approximately twice the amplitude of the fifth harmonic current. Accordingly, the reactance of $X_{1C_3}$ of capacitor $C_3$ should be one-half the reactance $X_{1C_5}$ the capacitor $C_5$. Accordingly, the capacitance in microfarads of capacitor $C_3$ will be twice the capacitance of the capacitor $C_5$ in microfarads. (The subscript 1 represents the reactance at the line or fundamental frequency.)

If a third filter $F_N$ is added to filter the seventh harmonic current, then the relative values of the capacitors in microfarads would be in the order of four, two and one for the third, fifth and seventh harmonics, respectively.

Since the capacitors $C_3$ and $C_5$ are connected in parallel and, as previously indicated, power factor correction is to be 33 ⅓ percent of the load rating in kilowatts, then the total value of the reactance of the capacitors is 3 times R in ohms.

The design of the filter requires that the reactive value of the inductances $L_3$ and $L_5$ also be determined. To find this value, it is first necessary to determine how much of the harmonic current is going to be removed. From a practical point of view, the value should be chosen by selecting the maximum amount which the utility will permit the user to reflect back into the supply line. Typically, a utility will permit up to 30 percent of the harmonic current to be reflected into the supply line. This means that 70 percent must be removed. If the utility requirements on harmonics are more severe, it is possible to remove an even higher percentage such as 75 percent. For purposes of illustrating the present invention and the principles incorporated herein, it has been assumed that the division of harmonics will be on a 70/30 basis; that is, 70 percent of the harmonics are absorbed and 30 percent are reflected back into the supply line.

Given the foregoing, the vector sum of the inductive reactance $X_{3L_3}$ and the capacitive reactance $X_{3C_3}$ at the third harmonic is chosen such that third harmonic current will divide with 70 percent passing through the filter and 30 percent passing through the reactance $X_1$ into the supply line. It therefore follows that:

$$+jX_{3L_3} - jX_{3C_3} = +j\,0.3/0.7X_{3l}\text{ ohms} \quad (1)$$

where $X_{3l}$ is the line reactance at the third harmonic frequency.

For the filter $F_5$, the reactive values are as follows:

$$+jX_{5L_5} - jX_{5C_5} = +j\,0.3/0.7X_{5l}\text{ ohms} \quad (2)$$

where $X_{5l}$ is the line reactance at the fifth harmonic frequency.

For the fundamental frequency, the filter $F_3$ will have the following value:

$$+jX_{1L_3} - jX_{1C_3} = -jX_{01C_3}\text{ ohms} \quad (3)$$

For the fundamental frequency, the fifth harmonic filter $F_5$ will have the following impedance value:

$$+jX_{1L_5} - jX_{1C_5} - jX_{01C_5}\text{ ohms} \quad (4)$$

Calculation of the foregoing may result in a capacitive reactance across the line that is somewhat lower than the value selected. In other words, it may be that the filters will give a capacitive KVAR greater than one-third KW as specified above. However, a working approximation should be sufficient in most cases and hence no recalculation is necessary.

Using the foregoing formulas, it is now possible to calculate the inductive and capacitive reactance for the inductor and capacitor in each of the filters $F_3$ and $F_5$ using in addition the following:

$$R = E_1^2 / \text{Power (Watts)} \tag{5}$$

$$X_{1l} = 0.35R \tag{6}$$

Formula (5) represents the load resistance in ohms at the fundamental frequency and formula (6) represents the line reactance in ohms at the fundamental frequency. By appropriate calculation:

$$X_{1L_3} = 0.521R \tag{7}$$

$$X_{1L_5} = 0.381R \tag{8}$$

$$X_{1C_3} = 4.5R \tag{9}$$

$$X_{1C_5} = 9.0R \tag{10}$$

Formula (7) represents the inductive reactance in filter $F_3$ at the fundamental frequency and formula (9) represents the capacitive reactance in the same filter at the same frequency.

Formula (8) represents the inductive reactance in ohms of the fundamental frequency for filter $F_5$ and formula (10) represents the capacitive reactance in the same filter at the same frequency.

The relationship between the resonant frequency and the fundamental frequency is given by equation (11)

$$f_r/f_1 = \sqrt{X_{1C}/X_{1L}} \tag{11}$$

where $f_r$ is the resonant frequency.

Using the values stated in equations (7), (8), (9) and (10), the following equations indicate the resonant frequency of $X_{L_3}$ and $X_{C_3}$ on the one hand and $X_{L_5}$ and $X_{C_5}$ on the other hand:

$$f_1 \sqrt{X_{1C_3}/X_{1L_3}} < 3f_1 \tag{12}$$

$$f_1 \sqrt{X_{1C_5}/X_{1L_5}} < 5f_1 \tag{13}$$

Expressions (12) and (13) clearly indicate that the filters $F_3$ and $F_5$ will divide the harmonic currents as intended and without resonance with the source harmonics of the frequency in question. Another way of putting the same point is set forth in equations (14) and (15).

$$X_{3L_3} \rightarrow X_{3C_3} \tag{14}$$

$$X_{5L_5} \rightarrow X_{5C_5} \tag{15}$$

Equations (14) and (15) show that neither filter $F_3$ nor filter $F_5$ presents a capacitive reactance at the assigned harmonic frequency. Rather, both filters shown an inductive reactance.

If ($I$) is taken as the full load current, then for the relationships given above, the third harmonic current in filter $F_3$ will be $F_{F_3} = 0.322I_1$ and the fifth harmonic current in the filter $F_5$ will be $I_{F_5} = 0.154I_1$. The third harmonic line current will be $0.138I_1$ and the fifth harmonic line current will be $0.066I_1$ as the maximum weighted values.

The foregoing indicate the relationships which may be used and specific examples of those relationships have been given. The following tables expand upon those relationships to provide a more complete indication of the relationship between the ohmic values for various line reactances $X_l$, harmonic current division between the line and the filters and power factor correction. It should be understood, however, that the tables are illustrative of selected changes. They are not intended to cover the infinite number of combinations than can be used.

In each of the tables set forth below, the following factors are fixed: load resistance $R$ is assumed to be a load corrected to unity power factor at the fundamental or operating frequency; the third and fifth harmonic currents are taken at 46 percent and 22 percent of the full load fundamental current; the basic power factor correction KVAR at the line is taken at one-third; and only the third and fifth harmonics are considered.

Table I

Line reactance = $X_l = .05R$

| Harmonic Line amp/ Filter amp | 20/80 | 30/70 | 40/60 | 50/50 |
|---|---|---|---|---|
| Component | | | | |
| $X_{1L_3}$ | .513R | .521R | .533 | .550 |
| $X_{1C_3}$ | 4.5R | 4.5R | 4.5R | 4.5R |
| $X_{1L_5}$ | .373R | .381R | .393R | .410R |
| $X_{1C_5}$ | 9.0R | 9.0R | 9.0R | 9.0R |
| $\sqrt{X_{1C_3}/X_{1L_3}}$ | 2.962 | 2.939 | 2.906 | 2.860 |
| $\sqrt{X_{1C_5}/X_{1L_5}}$ | 4.912 | 4.860 | 4.785 | 4.685 |

Table II

Line reactance = $X_l = .07R$

| Harmonic Line amp/ Filter amp | 20/80 | 30/70 | 40/60 | 50/50 |
|---|---|---|---|---|
| Component | | | | |
| $X_{1L_3}$ | .519 | .530R | .547 | .570R |
| $X_{1C_3}$ | 4.5R | 4.5R | 4.5R | 4.5R |
| $X_{1L}$ | .378R | .390R | .407R | .430R |
| $X_{1C}$ | 9.0R | 9.0R | 9.0R | 9.0R |
| $\sqrt{X_{1C_3}/X_{1L_3}}$ | 2.947 | 2.914 | 2.868 | 2.810 |
| $\sqrt{X_{1C_5}/X_{1L_5}}$ | 4.880 | 4.804 | 4.702 | 4.575 |

Table III

Line reactance = $X_l = .09R$

| Harmonic Line amp/ Filter amp | 20/80 | 30/70 | 40/60 | 50/50 |
|---|---|---|---|---|
| Component | | | | |
| $X_{1L_3}$ | .523R | .439R | .560R | .590R |
| $X_{1C_3}$ | 4.5R | 4.5R | 4.5R | 4.5R |
| $X_{1L}$ | .383R | .399R | .420R | .450R |
| $X_{1C}$ | 9.0R | 9.0R | 9.0R | 9.0R |
| $\sqrt{X_{1C_3}/X_{1L_3}}$ | 2.933 | 2.889 | 2.835 | 2.762 |
| $\sqrt{X_{1C_5}/X_{1L_5}}$ | 4.848 | 4.749 | 4.629 | 4.472 |

The foregoing tables do not set forth current or voltage values. These values are determined according to the power reading being considered. The basis for determining current and voltage is that each filter carries a current approximately equal to the RMS value of the fundamental frequency current plus the specific harmonic current. The RMS voltages across the capacitor and inductive reactor of each filter also depend on the combination of fundamental and harmonic voltage drops.

Tables I, II and III each show that the ratios $\sqrt{X_{1C_3}/X_{1L_3}}$ and $\sqrt{X_{1C_5}/X_{1L_5}}$ are less than three and five in each instance.

In the circuit for reducing the harmonics reflected into the power supply, no use has been made of resistors to assist in damping out the harmonic current. This is because it is intended that the circuit have minimum practical losses.

Figure 4:
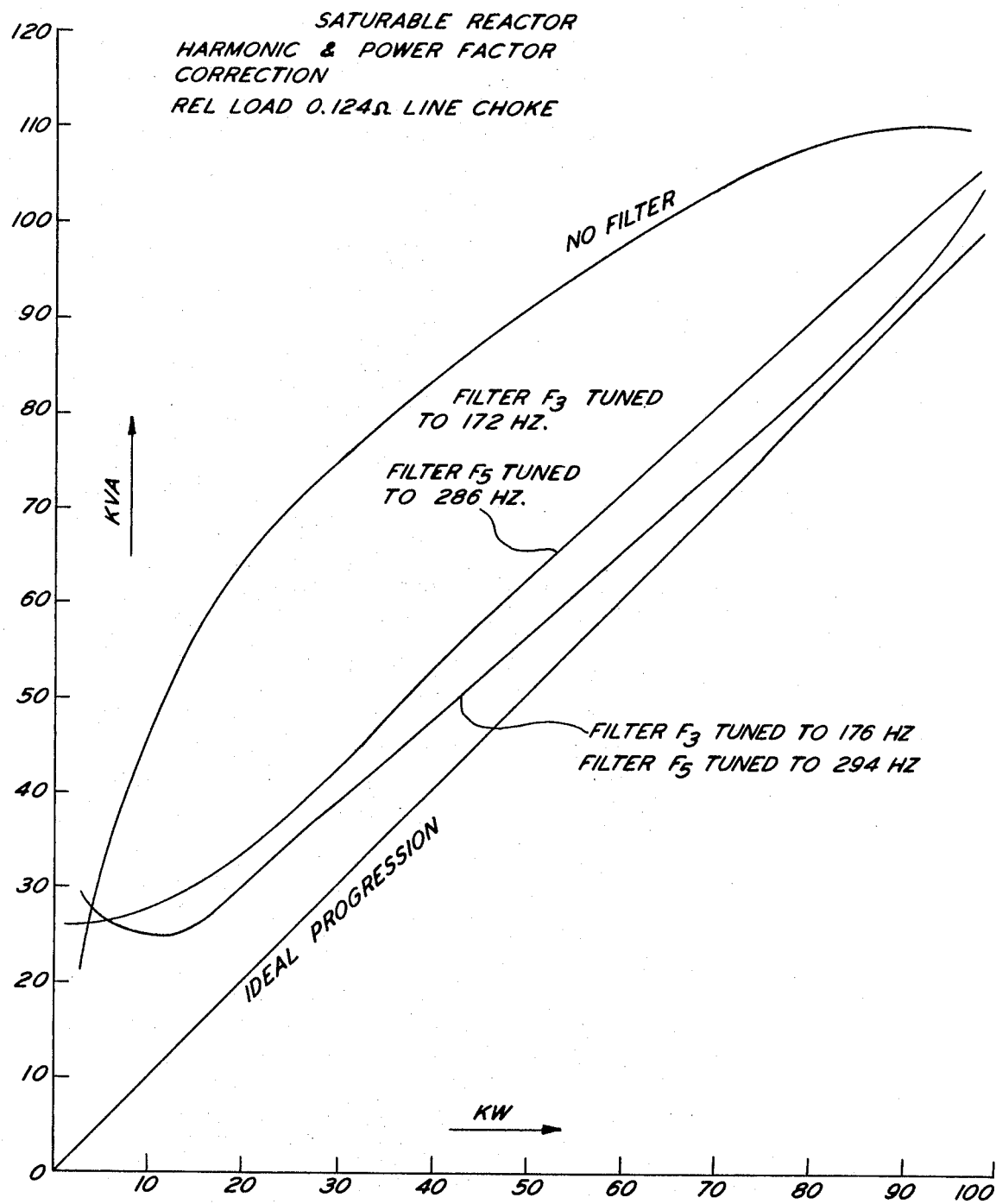
FIG. 4 is a graph plotting the relationship between kilowatts and line KVA for a simple reactor and two resonant values for the third and fifth harmonic filters connected as illustrated in FIG. 3.
Figure 5:
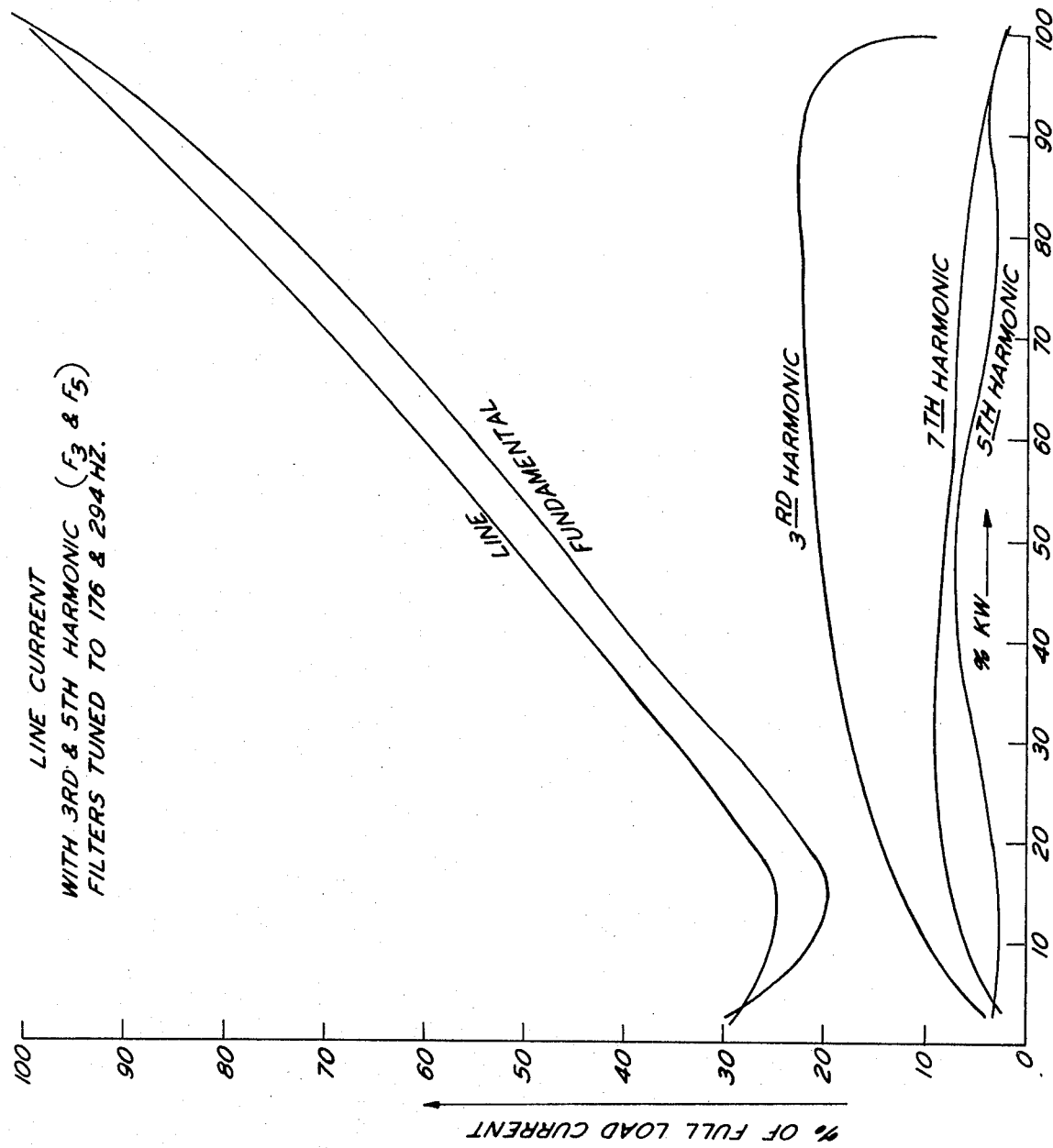
FIG. 5 is a graph plotting harmonic currents corresponding to the data used to plot the graph of FIG. 4.

FIG. 4 shows the practical effect of using circuits with filters designed as described above. This graph plots the results of using a saturable reactor to control an induction furnace operating from 60 Hz power supply. As indicated, the coordinates of the graph show the relationship between the watts (KW) and the line volt amperes (KVA) for a reactor and two resonant values of filters for the third and fifth harmonics; that is, the circuit illustrated in FIG. 3 without the filter $F_N$. This graph shows the marked improvement in power factor over a no filter condition. Admittedly, the line power factor is somewhat unfavorable at the low KW range. However, in this instance, the excess KVA is a leading power factor produced by maintaining the same filter combination over the full control range. Leading power factor unless excessive is usually not penalized by the utility companies as is lagging power factor.

The individual filters may be sectionalized by using more than one parallel inductor-capacitor section. The principles of designing a sectionalized filter are the same as explained above. A sectionalized filter may be desirable where a given load is to be operated at a very low power level for long periods of time. It already has been noted that there is a somewhat less favorable power factor near and at 100 percent power levels. Accordingly, it may be desirable to use sectionalized filters to correct the power factor at these levels as well.

It should also be understood that for other installations it may be desirable to use multiple and sectionalized filters for the same harmonics. This may be advantageous for large installations where the type of load changes and hence the various harmonics have different orders of importance. Also, it may not be desirable in some instances to be limited to only one ratio of harmonic line amperes to filter amperes.

Figure 6:
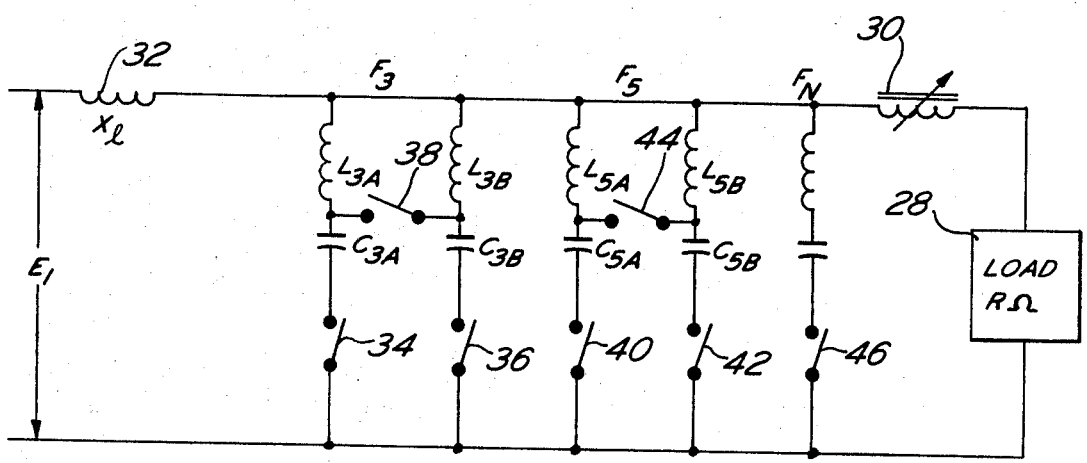
FIG. 6 is a schematic illustration of another form of filter which may be used with the present invention.

FIG. 6 illustrates another embodiment of the present invention wherein the filters have been sectionalized for removing excess power factor correction at the high and low power levels. As shown, the circuit comprises a load 28, a saturable reactor 30 and a coil 32 representing the line reactance. To this extent, the circuit is the same as that illustrated in FIG. 3. It is in the filters that it is different.

As shown, the filter $F_3$ comprises an inductance $L_{3A}$ and a capacitance $C_{3A}$ shunted across the line in series with the switch 34. In addition, the filter $F_3$ includes an inductance $L_{3B}$ in series with the capacitance $C_{3B}$ and a switch 36. A third switch 38 is connected across the filter sections. The switches 34 and 36 permit use of all or part of the filter $F_3$. The switch 38 connects the capacitors $C_{3A}$ and $C_{3B}$ in parallel to prevent a resonant relation between the two filter sections. In other words, for parallel operation, the inductances must be in parallel and the capacitors must also be in parallel. While the filter sections need not be equal in impedance, their individual resonant frequencies should be equal and lower than the frequency of the harmonic current they are designed to pass.

The filter $F_5$ is designed the same as the filter $F_3$. It comprises the inductances $L_{5A}$ and $L_{5B}$. The filter $F_5$ also includes the capacitances $C_{3A}$ and $C_{3B}$. The switches 40, 42 and 44 function in similar fashion to the switches 34, 36 and 38, respectively. The filter $F_N$ may be connected in the circuit by the switch 46 if desired.

The present invention may be embodied in other specific forms without departing from the spirit or essential attributes thereof and, accordingly, reference should be made to the appended claims, rather than to the foregoing specification as indicating the scope of the invention.

I claim:

1. In an electrical power system comprising a load, power factor correcting means, a non-linear device for controlling the power delivered to the load, said non-linear device having an inductive reactance and filter means for filtering harmonic currents, the improvement comprising: said filter means including an inductive-capacitive filter for each of one or more significant harmonic currents, each inductive-capacitive filter being tuned to less than the harmonic frequency of the current which is to filter, and each of said inductive-capacitive filters having a net inductive reactance at the harmonic frequency being filtered by it.

2. The electrical power system of claim 1 wherein the non-linear device for controlling the power is a saturable reactor.

3. The electrical power system in accordance with claim 1 wherein said power factor correcting means includes capacitive means for substantially correcting the power factor to unity at the fundamental frequency.

4. In a process for controlling the power delivered to a load using power factor correcting means, a non-linear device for controlling the power delivered to the load, said non-linear device having an inductive reactance filter means for filtering the harmonic currents, the improvement comprising: providing a series inductive-capacitive filter for each of one or more significant harmonic currents, tuning each inductive-capacitive filter to less than the harmonic frequency which it is to filter, and setting the impedance of each of said inductive-capacitive filters to have a net inductive reactance at the harmonic frequency being passed by it, said net inductive reactance being selected so that the harmonic current attributable to the non-linear control device divides in a predetermined ratio between each harmonic filter and the supply system delivering power.

5. The process for controlling the power delivered to a load in accordance with claim 4 including adjusting the capacitive element of each filter to provide a leading power factor component at the supply line frequency to compensate for a lagging power factor component imposed on the supply system by the non-linear device.

6. The electrical power system of claim 1 wherein the micro-farad value of the capacitive elements of the filters provide a leading power factor component at the supply frequency to compensate for the lagging power factor component imposed on the supply system by the non-linear device.

7. In an electrical power system for an inductive load, said inductive load being an induction furnace, power factor correcting means for said inductive load, a non-linear device comprising a saturable reactor for delivering power to the load, said non-linear device having an inductive reactance, and filter means for filtering harmonic currents, the improvement comprising:

said filter means including an inductive-capacitive filter for each of one or more significant harmonic currents, each inductive-capacitive filter being tuned to less than the harmonic frequency of the current which it is to filter, each of said inductive-capacitive filters having a net inductive reactance at the harmonic frequency being filtered by it, and the micro-farad value of the capacitive elements of the filters being such as to provide a leading power factor component at the supply frequency to compensate for the lagging power factor component imposed on the supply system by the non-linear device.

* * * * *